(12) United States Patent
Sarjanoja

(10) Patent No.: US 10,402,078 B2
(45) Date of Patent: Sep. 3, 2019

(54) METHOD AND APPARATUS FOR INTERACTIVE MOVEMENT OF DISPLAYED CONTENT

(75) Inventor: Ari-Heikki Sarjanoja, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 399 days.

(21) Appl. No.: 13/381,559

(22) PCT Filed: Jun. 29, 2009

(86) PCT No.: PCT/FI2009/050583
§ 371 (c)(1),
(2), (4) Date: Mar. 30, 2012

(87) PCT Pub. No.: WO2011/001001
PCT Pub. Date: Jan. 6, 2011

(65) Prior Publication Data
US 2012/0206497 A1    Aug. 16, 2012

(51) Int. Cl.
*G06F 3/0485* (2013.01)
*G06F 3/0481* (2013.01)
*G06F 3/0486* (2013.01)

(52) U.S. Cl.
CPC .......... *G06F 3/0485* (2013.01); *G06F 3/0481* (2013.01); *G06F 3/0486* (2013.01)

(58) Field of Classification Search
USPC ....................................................... 345/672
See application file for complete search history.

(56) References Cited

U.S. PATENT DOCUMENTS

| | | | |
|---|---|---|---|
| 5,452,414 A | 9/1995 | Rosendahl et al. | |
| 6,115,724 A | 9/2000 | Booker | |
| 6,141,018 A | 10/2000 | Beri et al. | |
| 6,448,984 B1 | 9/2002 | Smith et al. | |
| 6,621,532 B1 | 9/2003 | Mandt | |
| 6,683,629 B1 * | 1/2004 | Friskel | G06F 9/4443 715/804 |

(Continued)

FOREIGN PATENT DOCUMENTS

| | | |
|---|---|---|
| EP | 0570083 B1 | 8/1999 |
| EP | 170 4506 A | 9/2006 |

(Continued)

OTHER PUBLICATIONS

Colvin et al., "Viewing Email Headers", Search Organization, Version 6, Aug. 2005, pp. 1-15.

(Continued)

*Primary Examiner* — Stephen S Hong
*Assistant Examiner* — Richard M Russell
(74) *Attorney, Agent, or Firm* — Alston & Bird LLP

(57) ABSTRACT

First content displayed on screen may be translated by the user, for example by dragging. Second content may then be displayed in the area of the screen that is exposed by the translation of the first content. In some embodiments there is a conceptual link between the first and second content, for example the second content may be metadata relating to the first content. In effect, a multi-layered user interface is provided. The translation may be performed in response to a special user input, for example a multi-touch drag.

17 Claims, 7 Drawing Sheets

(56) References Cited

U.S. PATENT DOCUMENTS

| | | | |
|---|---|---|---|
| 6,765,567 B1* | 7/2004 | Roberson | G06F 3/04815 345/419 |
| 6,907,580 B2 | 6/2005 | Michelman et al. | |
| 7,673,251 B1* | 3/2010 | Wibisono | 715/771 |
| 2001/0024195 A1 | 9/2001 | Hayakawa | |
| 2002/0118230 A1* | 8/2002 | Card | G06F 3/04815 715/776 |
| 2004/0023707 A1* | 2/2004 | Maya | G07F 17/32 463/16 |
| 2004/0135815 A1 | 7/2004 | Browne et al. | |
| 2005/0102638 A1 | 5/2005 | Jiang et al. | |
| 2005/0154997 A1 | 7/2005 | Brun-Cottan et al. | |
| 2005/0195154 A1 | 9/2005 | Robbins et al. | |
| 2005/0216550 A1 | 9/2005 | Paseman et al. | |
| 2006/0026521 A1 | 2/2006 | Hotelling et al. | |
| 2006/0036946 A1* | 2/2006 | Radtke | G06F 3/0481 715/711 |
| 2007/0067738 A1 | 3/2007 | Flynt et al. | |
| 2007/0073751 A1 | 3/2007 | Morris et al. | |
| 2007/0150842 A1 | 6/2007 | Chaudhri et al. | |
| 2007/0245245 A1 | 10/2007 | Blue et al. | |
| 2008/0059897 A1 | 3/2008 | Dilorenzo | |
| 2008/0062141 A1 | 3/2008 | Chandhri | |
| 2008/0155576 A1* | 6/2008 | Horvitz | G06Q 30/0269 719/328 |
| 2008/0282202 A1 | 11/2008 | Sunday | |
| 2008/0301579 A1* | 12/2008 | Jonasson | G06F 17/30058 715/803 |
| 2009/0007017 A1* | 1/2009 | Anzures et al. | 715/835 |
| 2009/0013269 A1 | 1/2009 | Khandpur | |
| 2009/0030940 A1 | 1/2009 | Brezina et al. | |
| 2009/0031232 A1 | 1/2009 | Brezina et al. | |
| 2009/0040179 A1 | 2/2009 | Lee et al. | |
| 2009/0064055 A1 | 3/2009 | Chaudhri et al. | |
| 2009/0106659 A1 | 4/2009 | Rosser et al. | |
| 2009/0106676 A1 | 4/2009 | Brezina et al. | |
| 2009/0138475 A1 | 5/2009 | Caulkins | |
| 2009/0216806 A1 | 8/2009 | Feuerstein | |
| 2009/0234814 A1 | 9/2009 | Boerries et al. | |
| 2009/0237562 A1* | 9/2009 | Fujiwara | G06F 3/0481 348/564 |
| 2009/0287567 A1* | 11/2009 | Penberthy et al. | 705/14.43 |
| 2010/0058253 A1* | 3/2010 | Son | G06F 1/1616 715/863 |
| 2010/0153520 A1 | 6/2010 | Daun et al. | |
| 2010/0169364 A1 | 7/2010 | Hardt | |
| 2010/0235733 A1* | 9/2010 | Drislane | G06F 3/04883 715/702 |
| 2010/0306693 A1 | 12/2010 | Brinda | |
| 2011/0099507 A1 | 4/2011 | Nesladek et al. | |
| 2012/0206497 A1 | 8/2012 | Sarjanoja | |
| 2017/0003852 A1 | 1/2017 | Miyazaki et al. | |

FOREIGN PATENT DOCUMENTS

| | | | |
|---|---|---|---|
| EP | 2068237 | A2 | 6/2009 |
| WO | 0622725 | A1 | 11/1994 |
| WO | 1998/048552 | A1 | 10/1998 |
| WO | WO-2005/068089 | A2 | 7/2005 |
| WO | 2007/109480 | A3 | 9/2007 |
| WO | WO 2007/109480 | A2 | 9/2007 |
| WO | 2008/127537 | A1 | 10/2008 |

OTHER PUBLICATIONS

International Search Report and Written Opinion received for corresponding Patent Cooperation Treaty Application No. PCT/FI2009/050583, dated Apr. 1, 2010, 14 pages.
HTC—Products—HTC Hero—A Closer Look [online] [retrieved Sep. 4, 2014]. Retrieved from the Internet: <URL: http://web/archive.org/web/20091009113 11/http://www.htc.com/www/product/hero/a-closer-look.html>. (dated 2009) 1 page.
atebits—Tweetie for iPhone [online] [retrieved Sep. 4, 2014]. Retrieved from the Internet: <URL: http://web.archive.org/web/20100825095039/http://www.atebits.com/tweetie-iphone/screen-shots/>. (dated 2007-2009) 1 page.
Samsung I9000 Galaxy S review: From outer space—p. 4—GSMArena.com [online] [retrieved Sep. 4, 2014]. Retrieved from the Internet: <URL: http://www.gsmarena.com/samsung_i9000galazy_s-review-478p4.php>. (dated May 22, 2010) 4 pages.
4 finger swipes on Macbooks amazing [online] [retrieved Sep. 4, 2014]. Retrieved from the Internet: <URL: http://forum.notebookreview.com/apple-mac-os-x/481361-4-finger-swipes-macbooks-amazing.html>. (dated May 4, 2010) 4 pages.
Be still my heart: multi-touch tab switching in Firefox! [online] [retrieved Sep. 4, 2014]. Retrieved from the Internet: <URL: http://www.crunchgear.com/2009/06/30/be-still-my-heart-multi-touch-tab-switching-in-firefox/>. (dated Jun. 30, 2009) 5 pages.
International Preliminary Report on Patentability/Written Opinion for Application No. PCT/FI2011/050708 dated Feb. 26, 2013.
Office Action for U.S. Appl. No. 12/860,408 dated Jul. 20, 2012.
Office Action for U.S. Appl. No. 12/860,408 dated Mar. 18, 2013.
Office Action for U.S. Appl. No. 12/860,408 dated Jun. 18, 2013.
Office Action for U.S. Appl. No. 12/860,408 dated May 1, 2014.
Office Action for U.S. Appl. No. 12/860,408 dated Apr. 13, 2015.
Office Action for corresponding U.S. Appl. No. 12/860,408 dated Sep. 9, 2015.
Notice of Allowance for corresponding U.S. Appl. No. 12/860,408, dated Jan. 25, 2016, 5 pages.
International Search Report for Application No. PCT/FI2011/050708 dated Nov. 24, 2011.
Extended European Search Report for European Patent Application No. 09846734.3, dated Apr. 6, 2016, 9 pages.
Office Action for European Patent Application No. 09 846 734.3 dated Nov. 13, 2017, 9 pages.
Extended European Search Report for EP Application No. 11817814.4 dated Nov. 18, 2016, 10 pages.

\* cited by examiner

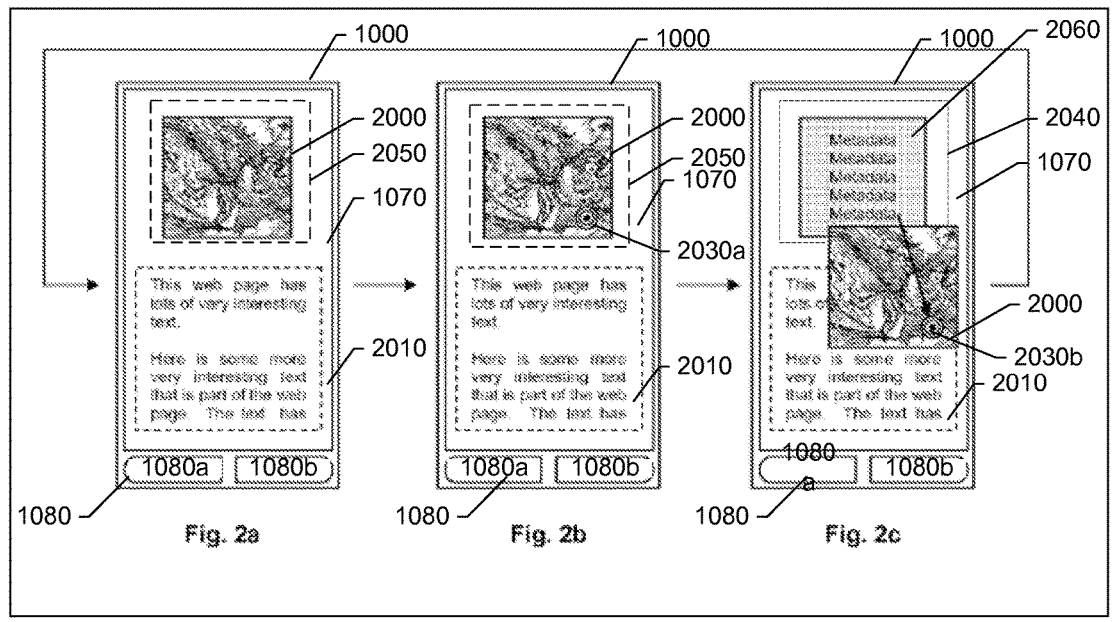
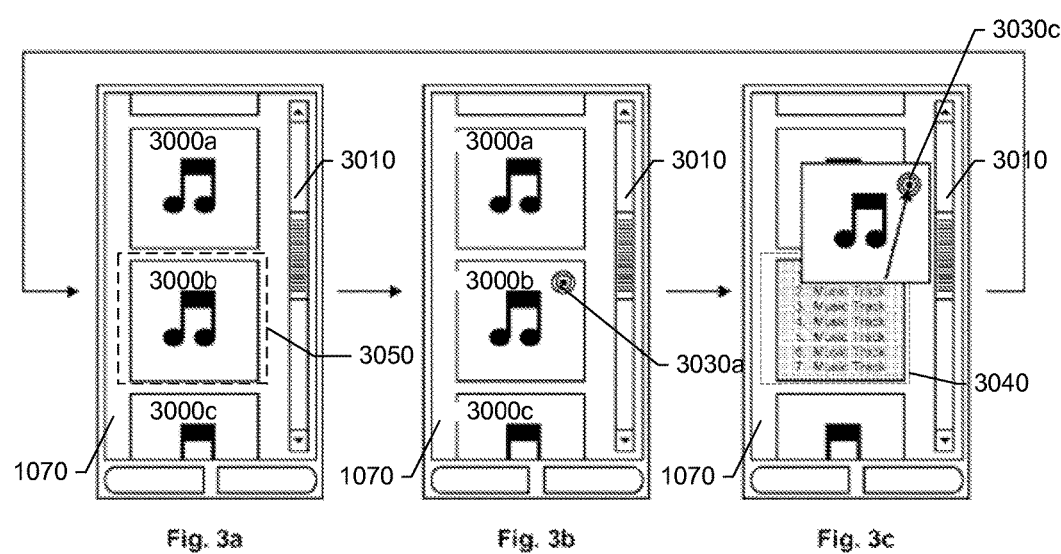

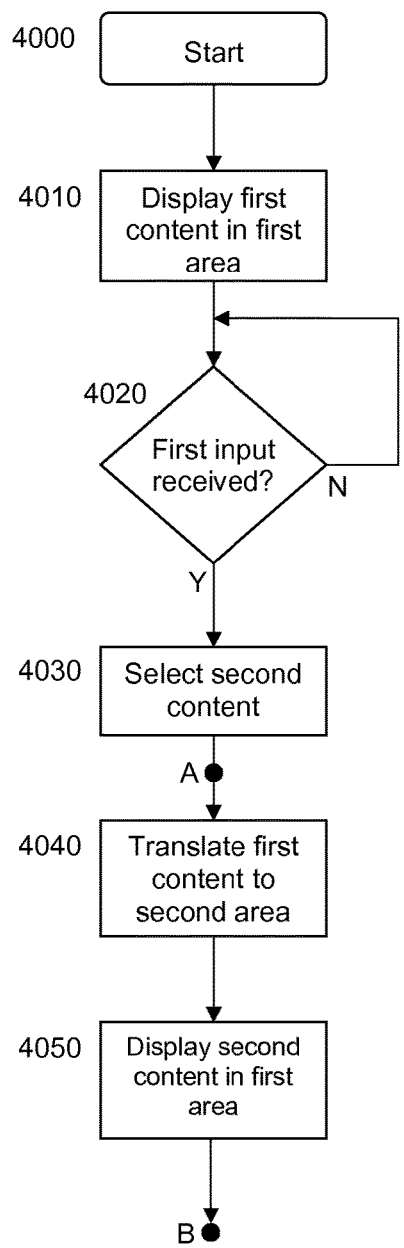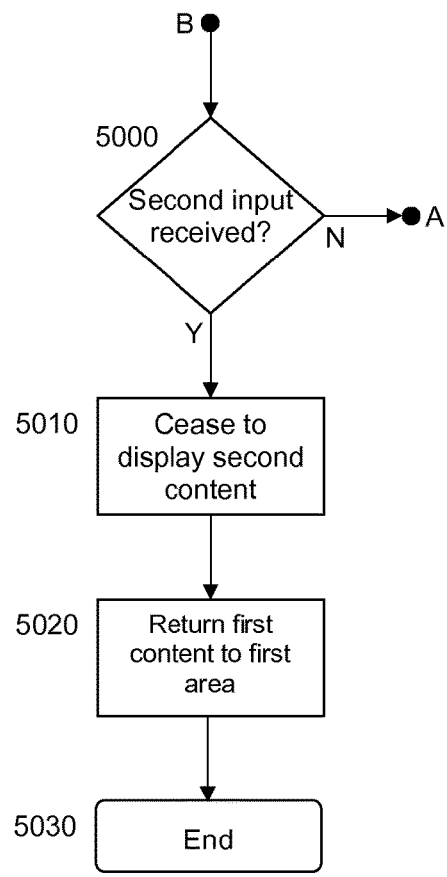
Fig. 5
Fig. 4

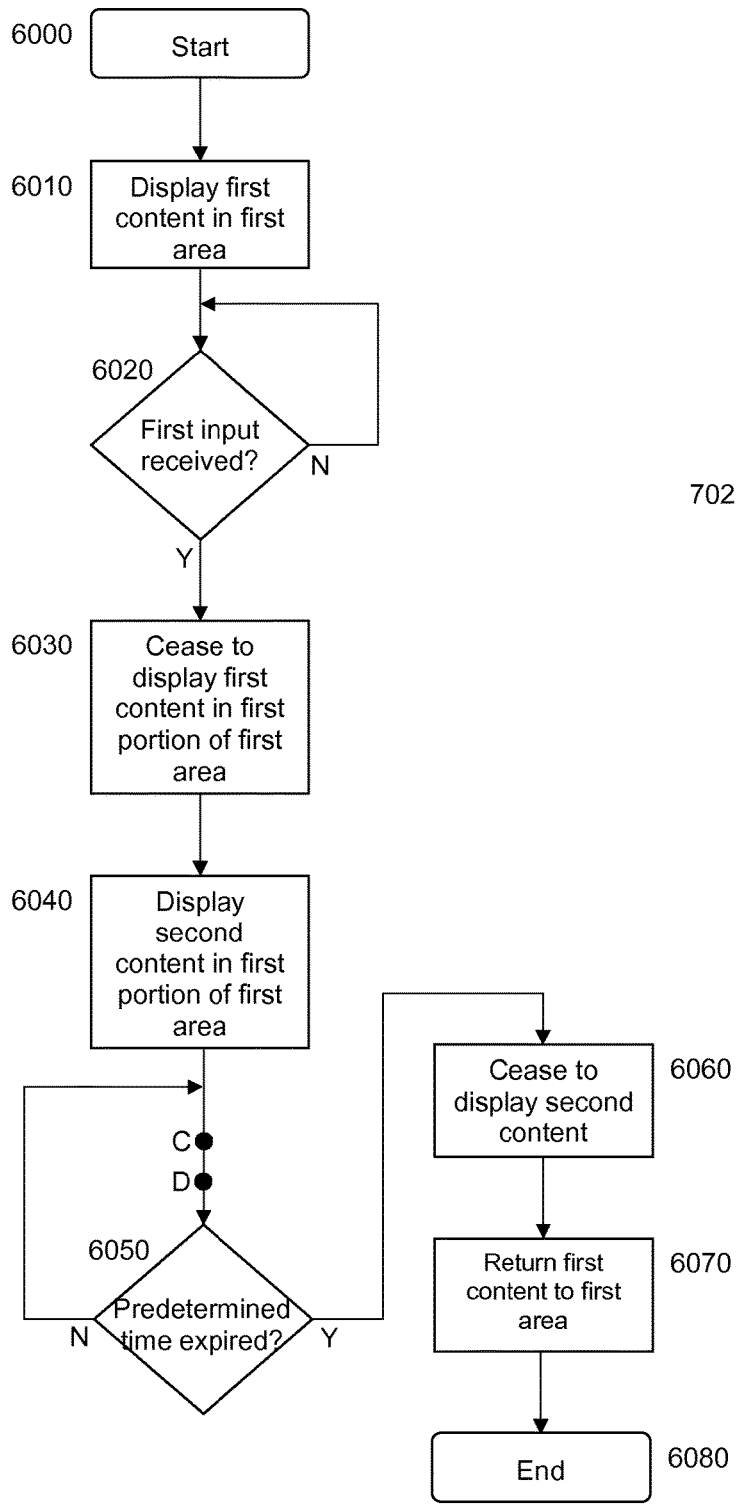
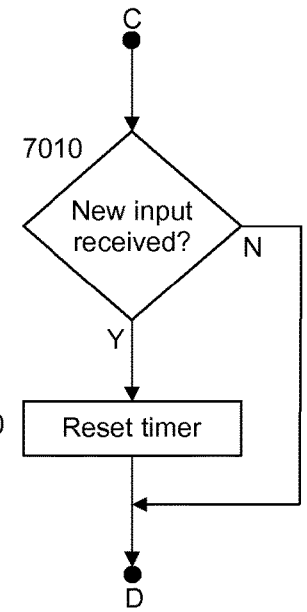
Fig. 7
Fig. 6

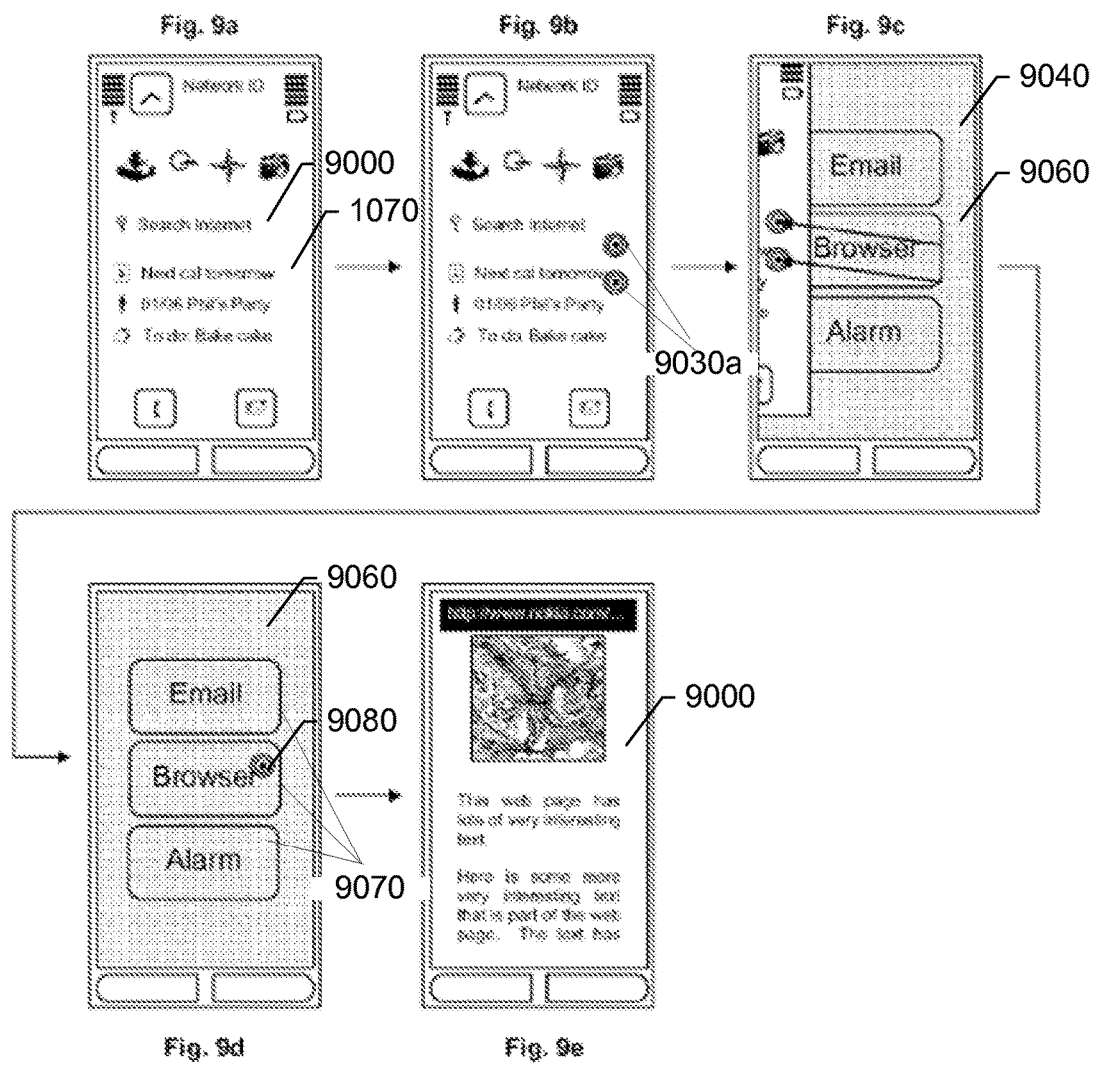

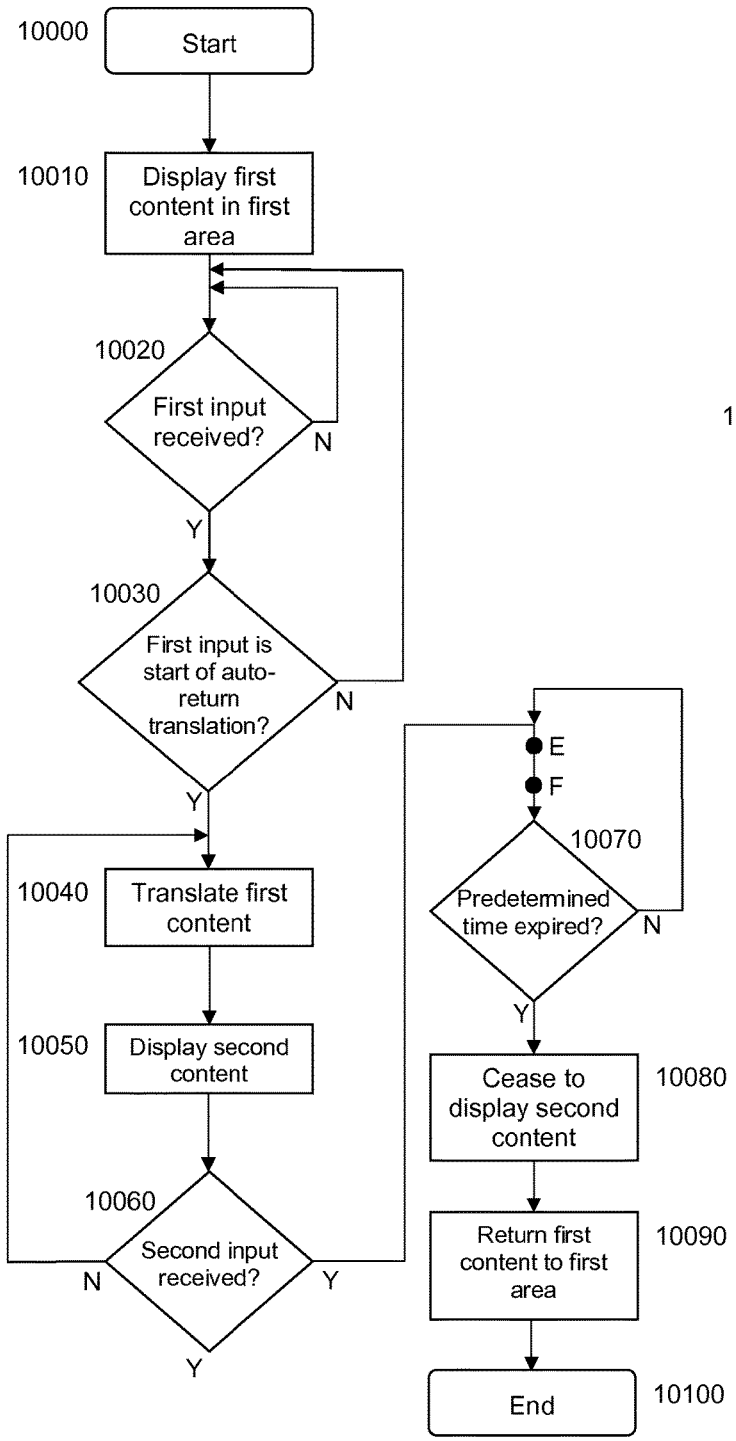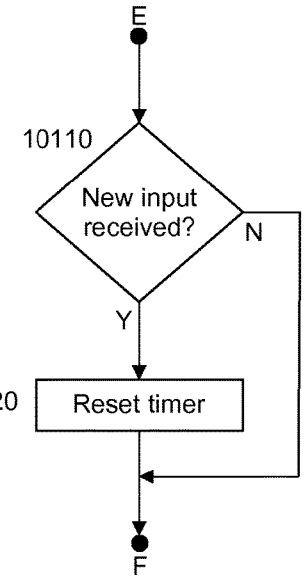
Fig. 10
Fig. 11

METHOD AND APPARATUS FOR INTERACTIVE MOVEMENT OF DISPLAYED CONTENT

RELATED APPLICATION

This application was originally filed as Patent Cooperation Treaty Application No. PCT/FI2009/050583 filed Jun. 29, 2009.

TECHNICAL FIELD

The present application relates generally to user interfaces for displaying content.

BACKGROUND

There has been a recent surge in the amount of content available to be viewed by users of computing devices, and in the number of devices available to the user in order to access this content.

Text, images and other visual content may be displayed to a user via his device's screen.

SUMMARY

Various aspects of examples of the invention are set out in the claims.

According to a first example, the present invention provides apparatus comprising: at least one processor; and at least one memory including computer program code, the at least one memory and the computer program code configured to, working with the at least one processor, cause at least the following to be performed: displaying first content on a display, such that the displayed first content fills a first area of the display; and in response to the reception of a first user input: translating the displayed first content to a second area of the display, thereby removing the displayed first content from a first portion of the first area, selecting second content based on said first content, and displaying the selected second content at least partially within the first portion of the first area.

According to a second example, the present invention provides Apparatus comprising means for: displaying first content on a display, such that the displayed first content fills a first area of the display; and in response to the reception of a first user input: translating the displayed first content to a second area of the display, thereby removing the displayed first content from at least a first portion of the first area, selecting second content based on said first content, and displaying the selected second content at least partially within the first portion of the first area.

According to a third example, the present invention provides a method comprising: displaying first content on a display, such that the displayed first content fills a first area of the display; and in response to the reception of a first user input: translating the displayed first content to a second area of the display, thereby removing the displayed first content from at least a first portion of the first area, selecting second content based on said first content, and displaying the selected second content at least partially within the first portion of the first area.

According to a fourth example, the present invention provides a computer-readable medium, having computer-readable instructions stored thereon for: displaying first content on a display, such that the displayed first content fills a first area of the display; and in response to the reception of a first user input: translating the displayed first content to a second area of the display, thereby removing the displayed first content from at least a first portion of the first area, selecting second content based on said first content, and displaying the selected second content at least partially within the first portion of the first area.

According to a fifth example, the present invention provides apparatus comprising: at least one processor; and at least one memory including computer program code, the at least one memory and the computer program code configured to, working with the at least one processor, cause the at least one processor to cause at least the following to be performed: displaying first content on a display, such that the displayed first content fills a first area of the display, and in response to the reception of a first user input: removing the displayed first content from a first portion the first area of the display, displaying second content on the display at least partially within the first portion, the second content including at least one interactive user interface component, and after a predetermined period of time, ceasing to display the first content in the second area of the display and redisplaying the first content in the first area of the display.

According to a sixth example, the present invention provides apparatus comprising means for: displaying first content on a display, such that the displayed first content fills a first area of the display, and in response to the reception of a first user input: removing the displayed first content from a first portion the first area of the display, displaying second content on the display at least partially within the first portion, the second content including at least one interactive user interface component, and after a predetermined period of time, ceasing to display the first content in the second area of the display and redisplaying the first content in the first area of the display.

According to a seventh example, the present invention provides a method comprising: displaying first content on a display, such that the displayed first content fills a first area of the display, and in response to the reception of a first user input: removing the displayed first content from a first portion the first area of the display, displaying second content on the display at least partially within the first portion, the second content including at least one interactive user interface component, and after a predetermined period of time, ceasing to display the first content in the second area of the display and redisplaying the first content in the first area of the display.

According to an eighth example, the present invention provides a computer-readable medium, having computer-readable instructions stored thereon for: displaying first content on a display, such that the displayed first content fills a first area of the display, and in response to the reception of a first user input: removing the displayed first content from a first portion the first area of the display, displaying second content on the display at least partially within the first portion, the second content including at least one interactive user interface component, and after a predetermined period of time, ceasing to display the first content in the second area of the display and redisplaying the first content in the first area of the display.

According to a ninth example, the present invention provides apparatus comprising: at least one processor; and at least one memory including computer program code, the at least one memory and the computer program code configured to, working with the at least one processor, cause the at least one processor to cause at least the following to be performed: displaying first content on a display, such that the displayed first content fills a first area of the display;

recognising a first user input as corresponding to the start of an automatically-returned translation of the first content; recognising a second user input as the end of an automatically-returned translation of the first content, the recognition of the second input occurring after the recognition of the first input; in response to the recognition of the first user input: translating the displayed first content across the display, thereby removing the displayed first content from a first portion of the first area of the display, and displaying second content on the display at least partially within the first portion; and in response to the recognition of the second user input: ceasing to display the second content in the second area of the display, and redisplaying the first content in the first area of the display.

According to a tenth example, the present invention provides apparatus comprising means for: displaying first content on a display, such that the displayed first content fills a first area of the display; recognising a first user input as corresponding to the start of an automatically-returned translation of the first content; recognising a second user input as the end of an automatically-returned translation of the first content, the recognition of the second input occurring after the recognition of the first input; in response to the recognition of the first user input: translating the displayed first content across the display, thereby removing the displayed first content from a first portion of the first area of the display, and displaying second content on the display at least partially within the first portion; and in response to the recognition of the second user input: ceasing to display the second content in the second area of the display, and redisplaying the first content in the first area of the display.

According to an eleventh example, the present invention provides a method comprising: displaying first content on a display, such that the displayed first content fills a first area of the display; recognising a first user input as corresponding to the start of an automatically-returned translation of the first content; recognising a second user input as the end of an automatically-returned translation of the first content, the recognition of the second input occurring after the recognition of the first input; in response to the recognition of the first user input: translating the displayed first content across the display, thereby removing the displayed first content from a first portion of the first area of the display, and displaying second content on the display at least partially within the first portion; and in response to the recognition of the second user input: ceasing to display the second content in the second area of the display, and redisplaying the first content in the first area of the display.

According to a twelfth example, the present invention provides a computer-readable medium, having computer-readable instructions stored thereon for: displaying first content on a display, such that the displayed first content fills a first area of the display; recognising a first user input as corresponding to the start of an automatically-returned translation of the first content; recognising a second user input as the end of an automatically-returned translation of the first content, the recognition of the second input occurring after the recognition of the first input; in response to the recognition of the first user input: translating the displayed first content across the display, thereby removing the displayed first content from a first portion of the first area of the display, and displaying second content on the display at least partially within the first portion; and in response to the recognition of the second user input: ceasing to display the second content in the second area of the display, and redisplaying the first content in the first area of the display.

BRIEF DESCRIPTION OF THE DRAWINGS

For a more complete understanding of example embodiments of the present invention, reference is now made to the following descriptions taken in connection with the accompanying drawings in which:

FIGS. 2a-c are illustrations of a user interface;
FIGS. 3a-c are illustrations of a user interface;
FIG. 4 is a flow chart depicting a method;
FIG. 5 is a flow chart depicting additional steps that may be introduced between points A and B of the method of FIG. 4;
FIG. 6 is a flow chart depicting a method;
FIG. 7 is a flow chart depicting additional steps that may be introduced between points C and D of the method of FIG. 6;
FIGS. 9a-e are illustrations of a user interface;
FIG. 10 is a flow chart depicting a method;
FIG. 11 is a flow chart depicting additional method steps that may be introduced between points E and F of the method of FIG. 10.

DETAILED DESCRIPTION

Figure 1:
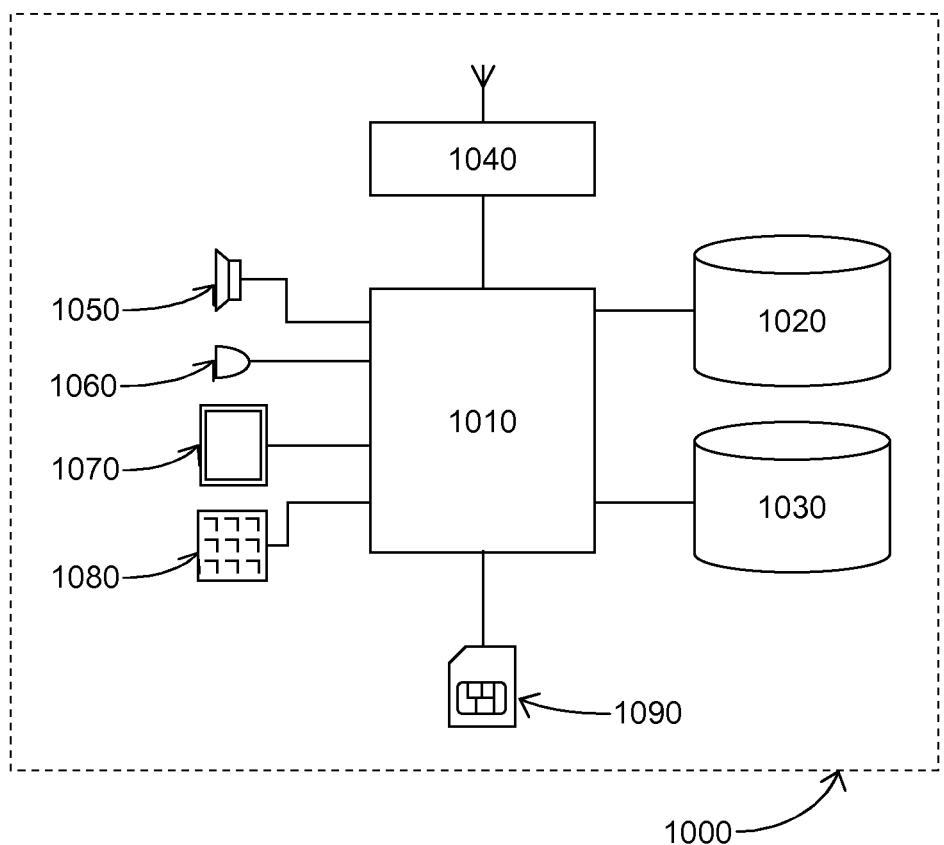
FIG. 1 is a schematic illustration of a mobile phone.

Exemplary embodiments of the present invention are set out in the claims, and these and their potential advantages may be understood by referring to the drawings.

FIG. 1 illustrates a mobile phone 1000 comprising a Central Processing Unit (CPU) 1010 coupled to non-volatile storage memory 1020, and Random Access Memory (RAM) 1030. The CPU 1010 could be implemented in a single integrated circuit, or could be distributed between multiple integrated circuits and/or other components. The storage memory 1020 stores program instructions that implement an operating system when executed by the CPU 1010 and may also store program instructions relating to one or more applications.

In operation, the phone 1000 runs under the control of the operating system. The operating system controls the access of applications programs that run on the phone 100 to the hardware of the device, including their access to the memory 1020, 1030 of the phone 1000. The operating system is capable of preventing each application from accessing certain areas of the memory 1020, 1030 that might be reserved to the operating system or to other applications. In contrast, components of the operating system may have unrestricted access to any areas of the memory 1020, 1030 that are accessible by the CPU 1010.

In order for the CPU 1010 to run the operating system and potentially also applications stored in the non-volatile memory 1020, the implementing program instructions must first be copied from the non-volatile memory 1020 into RAM 1030.

The CPU 1010 is also coupled to a number of other hardware elements of the phone. These include a radio frequency transceiver 1040 for communicating with a mobile telephony network, a speaker 1050, a microphone 1060, a display 1070, and a hardware keypad 1080. The display 1070 may be a touch screen. The CPU is also coupled to a user identity module (1090) such as a Subscriber Identity Module (SIM) card. The UIM 38 may store information elements related to a subscriber, an operator, a user account, and/or the like.

It will be understood that although the embodiments will be described in relation to a mobile phone 1000, other embodiments are possible, for example other types of mobile and static computing devices, including media player devices, personal computers, Personal Digital Assistants (PDAs), and gaming consoles. Similarly, the mobile phone 1000 illustrated in FIG. 1 is exemplary only—it is not essential that all the illustrated features be present.

FIGS. 2*a-c* illustrate the phone 1000 of FIG. 1 with a web page displayed on the display 1070. The web page comprises an image 2000 and a passage of text 2010. Also illustrated are two hardware buttons 1080*a* and 1080*b* forming at least part of keypad 1080. In the illustrated embodiment, the display 1070 is a touch screen.

In FIG. 2*a* the image is displayed in a first area 2050 of the screen, defined by the rendering of the web page by a web browser application.

In FIG. 2*b*, the user has touched the screen within the first area 2050, i.e. on the displayed image 2000. The touch may be made using the user's finger, a stylus, or another suitable object, and is illustrated by point 2030*a*.

In FIG. 2*c*, the user has dragged the touch point to a new location 2030*b*. In response to this drag operation, the displayed image 2000 has been translated to a second area of the screen, where it is displayed. The translation of the image 2000 is defined by the drag operation, and may correspond to the same distance and direction as the drag operation itself. Because the image 2000 has been translated partially out of the first area 2050, a portion 2040 of the first area (preciously covered by the image 2000) has been exposed. If the image 2000 were translated entirely out of the first area 2050, the exposed portion 2040 would be the entirety of the first area 2050.

The exposed portion 2040 of the first area 2050 represents new screen 'real estate' that can be used to display additional content. In the illustrated example, metadata 2060 relating to the image are displayed in the exposed portion 2040. The representation of the metadata 2060 may be scaled so that it is entirely visible within the exposed portion 2040, or it may be scaled to first area 2050, so that it is only fully displayed when the image 2000 is fully removed from the first area. Examples of suitable metadata may include copyright information relating to the image, a title of the image, a description of the image's contents, dimensions of the image, and/or other metadata.

Finally, the user ends the drag operation by removing his finger (or stylus, etc.) from the touch screen. In response, the image 2000 is returned to the first area 2050. Since the previously exposed portion is now covered by the image 2000, the representation of the metadata 2060 is no longer visible—as shown in FIG. 2*a*.

In the example shown in FIG. 2*a-c*, the image was translated by a drag-release operation on a touch screen. However, alternative embodiments may use other suitable inputs. For example, the drag operation may be performed using a cursor controlled by a joystick, track ball, keypad, or other suitable input device. Similarly, the input need not be a drag-release operation, but could relate to other inputs (for example, separate selections of first the image and then the location to which it is to be translated).

In some embodiments the image may be returned to the first area by a translation from the second area. In alternative embodiments, other effects may be used, for example removing the image from the second area and displaying it in the first area in the absence of a translation effect. In the latter case, a fading effect may be used.

Although the translated content in FIGS. 2*a-c* is an image, other content may be translated to reveal the metadata 2060. For example, the text area 2010 of the webpage may be translated in order to reveal metadata beneath it (for example a summary of its contents, copyright information, and/or the author's name).

In some embodiments, the metadata relates directly to the content that has been translated to reveal it. In some other embodiments, the first content may be translated to reveal second content that is not metadata relating directly to the first content. In such embodiments, there may still have been a selection of the second content to display based on the first content. For example, the first and second content may be related to a common subject. The user may therefore translate the first content in order to view additional information about the subject to which the first content referred.

Non-exhaustive examples of content relating to a common subject include: an image of a film poster that can be translated to reveal details of the film (e.g. a synopsis, reviews, showing times, etc.); an image of an album cover than can be translated to reveal track listings; a puzzle or other exercise that can be translated to reveal its solution; and an image of an item for sale that can be translated to reveal the purchase price.

FIG. 3*a* illustrates an embodiment where translatable representations 3000*a-c* of music albums are displayed within a music player application. The representations in this example are images of the albums' covers, and can be scrolled through using a scrollbar 3010.

In FIG. 3*b*, the user has selected image 3000*b* in a first area 3050 of the display by touching it at point 3030*a*.

In FIG. 3*c*, the user has performed a drag operation from point 3030*a* to 3030*b*, and the selected image 3000*b* has been translated its original location in the first area 3050 along a path defined by the drag operation. The translation has exposed a portion 3040 of a first area 3050 of the display that was previously covered by the now translated image 3000*b*. In response to the drag operation, a track listing 3060 of the album to which the album cover 3000 relates has been selected, and this listing 3060 is displayed in the first area 2050. However, since the album cover image 3000*b* has been only partially translated out of the first area, the track listing 3060 is only visible in the exposed portion 3040 of the first area 2050. By further translating the image of the album cover 3000*b*, the user can reveal the concealed part of the listing 3060.

Finally, when the user ends the drag operation (for example, by ceasing to touch the screen 1070), the image of the album cover 3000*b* is returned to the first area 3050, concealing the track listing 3060.

An exemplary embodiment of the methods described in relation to FIGS. 2*a-c* and 3*a-c* is illustrated in FIGS. 4 and 5.

The method of FIG. 4 begins at step 4000. In step 4010, first content is displayed in a first area of the display. Then, when a first user input (for example, the start of a drag operation) is received 4020, second content is selected based on the first content 4030, the first content is translated to a second area of the display 4040, and the second content is displayed in the first area 4050 (and will be visible in the portion of the first area out of which the first content has been translated).

FIG. 5 illustrates method steps that may be used to extend the method of FIG. 4. Starting from immediately after step 4050, the method of FIG. 5 loops back to step 4040 until a second input is received 5000. The effect of this is to allow the user to continue translating the first content, for example to further the first area. Once the second user input (e.g. a release operation, ending the drag) has been received, the second content ceases to be displayed 5010, and the first content is returned to the first area 5020, for example by a reverse translation. The method then ends at step 5030.

In some embodiments it may be desirable that the newly revealed content displayed as the result of a translation is selectable by the user. For example, in the example of FIG. 3a-c, the user might be permitted to select a music track in the listing 3060 for playback. For this reason, amongst other possible reasons, the translated content might not be returned immediately once the user input to end the translation has been received, providing an opportunity for the user to interact with interactive components of the revealed content (for example with .user-operable components such as buttons, sliders, and hyperlinks).

In order to provide an opportunity for the user to easily interact with the revealed content, in some embodiments the translated content will not be immediately returned to the first area. In some embodiments, this may be achieved by translating the first content very slowly back to the first area, in order to give the user sufficient time to interact with the user interface components in the second content before they are obscured by the returned first content. In other embodiments, the translated first content will remain in the second area for a predetermined period of time before returning to the first area. During the predetermined period of time, the user is free to interact with the second content.

FIG. 6 illustrates a method in which removed content is held at its new location for a predetermined period of time before being returned to its original location. The method begins at step 6000. At step 6010, first content is displayed in the first area. When the first user input has been received 6020, the first content ceases to be displayed in a first portion of the first area 6030, and second content is displayed in its place. After a predetermined period of time has expired 6050, the second content ceases to be displayed 6070, and the first content is redisplayed in the first portion of the first area 6080. The method then ends 6090.

FIG. 7 illustrates an extension to the method of FIG. 6 with new steps inserted between steps 6040 and 6050. The new steps include testing to see whether a new user input has been received 7000, and if so resetting the predetermined period of time ("resetting the timer") 7010. As a result, the second content will only be replaced by the first content once the user ceases to interact with the second content.

It will be noted that in the methods of FIG. 6 and FIG. 7 the process by which the first content is removed from the first portion of the first area is not necessarily a translation. Indeed, the method will find application for other types of effect that may be triggered by the first input, for example a fading out of the first content, a flipping of the first content (so that the second content appears to be located on the reverse side of the first content), or any other suitable effect.

Figures 8A, 8B, 8C:
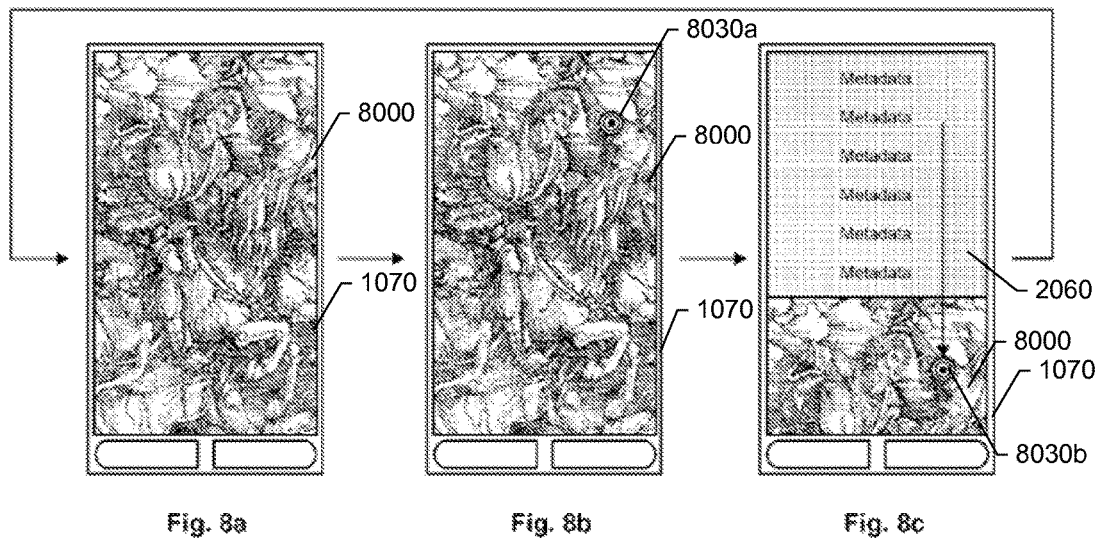
FIGS. 8a-c are illustrations of a user interface.

Returning to the embodiments where the effect is a translation, it will be understood that the translation is not necessarily limited to the confines of the display. Instead, in some embodiments the translated content may be relocated at least partially outside the visible extend of the display. See for example, FIG. 8, which depicts an image 8000 that fills the display 1070. Were the translation restricted to the visible bounds of the display, it would not be possible to translate the image 8000; however, by performing a drag operation between points 8030a and 8030b, the user is able to translate the image 8000 so that it extends at least partially outside the visible bounds of the display 1070, thus enabling the second content (metadata 2060) to be displayed in the image's original location (in this case filling the display 1070).

FIGS. 9a-e illustrate an exemplary embodiment in which the entire contents of the display 1070 is translated on receipt of a special user input.

In FIG. 9a, the entire display is filled with a home screen 9000.

In FIG. 9b, the user touches the screen at two locations 9030a simultaneously, in a multi-touch gesture. At this point, or alternatively as he begins to drag the two points 9030a, the input is interpreted as a special automatically-returned translation (and in the illustrated case, a translation of the entire screen contents) and the contents of the display are in response translated as the user moves the touch points 9030a.

In FIG. 9c, the user input has led to the translation of the initial contents 9000 of the display, revealing a portion 9040 of the display. New content is displayed in this revealed portion 9040. In the example shown in FIG. 9c, the new content is a task manager interface 9060, but other types of content may be displayed instead. for example, the new content may relate to other status information about the phone 1000.

In some embodiments, the original content 9000 is completely removed from the display 1070. This complete removal may be dependent, for example, upon the user input instructing a translation of at least a minimum distance, or resulting in a minimum proportion of the original content 9000 being translated outside the visible boundaries of the display 1070. The original display is automatically returned to fill the display, for after a predetermined period of time has elapsed (as described above). However, in some embodiments the automatic return may not be performed in certain cases.

In the embodiment illustrated in FIG. 9d, the home page content 9000 will not return until a predetermined period of time has expired after the translation. However, in some cases the home screen may not automatically return at all—despite the fact that the user input is recognised as an automatically-returned translation. In its place, a task manager interface 9060 is displayed, including user-selectable representations 9070 of the applications currently running on the phone. The user has selected a representation of the web browser by tapping that button at point 9080, and in response the web browser 9090 is displayed. In this embodiment, the home screen is not returned to the display if the user selects an application to switch to in the task manager interface, but will return otherwise after a predetermined period of time.

FIG. 9e shows the web browser 9000 displayed on the screen 1070.

FIGS. 9a-e illustrate an embodiment where the home screen is translated in order that other content can be displayed. However, in other embodiments, other screens may be translated in order to display the home page.

In the examples given above, the translation of the "entire display" has been described. Where the user interface of a device includes one or more status panes (for example a status, or "task" bar) that are normally permanently displayed during operation of the device, references to the entire screen may instead be taken to refer to the entirety of a main panel of the display, excluding the status pane(s).

FIG. 10 shows an exemplary method for implementing the operation shown in FIGS. 9a-e. The method starts at step 10000, after which first content is displayed 10010 in a first area of the display. Once a user input is received 10020, it is determined whether the input is a special input that is associated with an automatically returning translation operation 10030. One possible such input is a multi-touch drag, where a predetermined number of separate touch points are simultaneously dragged across a touch screen. If the received input is the special input, the first content is translated across the display, exposing a first portion of the first area 10040. Second content is then displayed in the first portion of the first area 10050. When a second input (for example the release of the multi-touch drag) is received 10060, the second content ceases to be displayed 10070 and the first content is redisplayed in the first area 10090. The method then ends 10100.

FIG. 11 shows an extension to the method of FIG. 10, comprising additional steps 10110, 10120 that are inserted between steps 10060 and 10070 of FIG. 10. These steps serve to detect the presence of a new user input 10110 and in response restart the predetermined period of time 10120 before the first content is automatically returned to the first area. An effect of this is to maintain the translation whilst the user interacts with the second content.

Without in any way limiting the scope, interpretation, or application of the claims appearing below, a technical effect of one or more of the example embodiments disclosed herein is to render additional content easily accessible in a user interface, when desired, and providing a clear conceptual route to said content.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any media or means that can contain, or store the instructions for use by or in connection with an instruction execution system, apparatus, or device, such as a computer, with one example of a suitable apparatus described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other—even when described in relation to different embodiments. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Also, whilst the above describes example embodiments of the invention, these descriptions should not be viewed in a limiting sense. Rather, there are several variations and modifications which may be made without departing from the scope of the invention as defined in the appended claims.

The invention claimed is:

1. An apparatus comprising: at least one processor; and at least one memory including computer program code, the at least one memory and the computer program code configured to, working with the at least one processor, cause at least the following to be performed:
   causing display of at least two first content items in a display region of a display, such that each of the displayed first content items fills a respective first area of the display region;
   determining second content items comprising metadata relating to each of the respective first content items, wherein each of the second content items provide additional information about the respective first content item, wherein prior to a drag input associated with a particular displayed first content item, a respective second content item comprising the metadata related to the particular displayed first content item is entirely obscured by the respective displayed first content item;
   enabling the first content items to be dragged and translated independently of each other, such that in response to the reception of a first user input being the drag input associated with the particular displayed first content item, the at least one memory and the computer program code are configured to cause: a) translating the particular displayed first content item to a second area of the display region along a path defined by the drag input, thereby gradually removing the particular displayed first content item from the respective first area of the display, and b) causing the respective second content item, comprising the metadata relating to the particular displayed first content item, to be gradually revealed and displayed only in the respective first area of the display region that was previously obscured, such that a dragging of the particular displayed first content item completely out of the respective first area of the display region results in the respective second content item filling the respective first area of the display region; and
   in response to a reception of a second user input being a release of the drag input performed while the particular displayed first content item and the respective second content item are displayed, ceasing to display the respective second content item and causing redisplay of the particular displayed first content item such that the particular displayed first content item fills the respective first area of the display region, wherein the respective second content item is ceased to be displayed and the particular displayed first content item fills the respective first area of the display region responsive to the release occurring in any area of the display region, the release capable of being performed in all areas of the display region.

2. The apparatus of claim 1, wherein the display is a touch screen display.

3. The apparatus of claim 1, wherein causing the redisplay of the particular displayed first content in the respective first area of the display comprises repositioning the particular displayed first content from the second area of the display to the respective first area of the display.

4. The apparatus of claim 1, wherein the particular displayed first content item is an image.

5. The apparatus of claim 1, wherein the particular displayed first content item comprises a graphical representation associated with a collection of media content, and the respective second content item identifies media content within the collection.

6. The apparatus of claim 1, wherein the second content item comprises at least one interactive user interface component.

7. The apparatus of claim 1, wherein the at least one memory and the computer program code are further configured to cause the apparatus to: cause display of the at least two first content items in a scrollable portion; and in response to the first user input, translating the particular displayed first content item while other first content items remain stationary.

8. The apparatus of claim 1, wherein the metadata comprises details relating to the particular displayed first content item.

9. The apparatus of claim 1, wherein the metadata comprises at least one of a summary of the particular displayed first content item, copyright information associated with the particular displayed first content item, or an author associated with the particular displayed first content item.

10. The apparatus of claim 1, wherein causing the respective second content item comprising the metadata relating to the particular displayed first content item to be revealed in the respective first area of the display that was previously obscured comprises causing the respective second content item to only be displayed in the respective first area of the display.

11. The apparatus of claim 1, wherein causing the respective second content item comprising the metadata relating to the particular displayed first content item to be revealed in the respective first area of the display previously obscured comprises causing the respective second content item to fill the respective first area of the display.

12. The apparatus of claim 1, wherein each of the at least two distinct first content items is respectively and individually configured to be translated to reveal underlying respective second content items in response to user input dragging the respective first content items.

13. A method comprising:
causing display of at least two first content items in a display region of a display, such that each of the displayed first content items fills a respective first area of the display region;
determining second content items comprising metadata relating to each of the respective first content items, wherein each of the second content items provide additional information about the respective first content item, wherein prior to a drag input associated with a particular displayed first content item, a respective second content item comprising the metadata related to the particular displayed first content item is entirely obscured by the respective displayed first content item;
enabling the first content items to be dragged and translated independently of each other, such that in response to the reception of a first user input being the drag input associated with the particular displayed first content item, the method causes: a) translating the particular displayed first content item to a second area of the display region along a path defined by the drag input, thereby gradually removing the particular displayed first content item from the respective first area of the display, and b) causing the respective second content item comprising the metadata relating to the particular displayed first content item, to be gradually revealed and displayed only in the respective first area of the display region that was previously obscured, such that a dragging of the particular displayed first content item completely out of the respective first area of the display region results in the respective second content item filling the respective first area of the display region; and
in response to a reception of a second user input being a release of the drag input performed while the particular displayed first content item and the respective second content item are displayed, ceasing to display the respective second content item and causing redisplay of the particular displayed first content item such that the particular displayed first content item fills the respective first area of the display region, wherein the respective second content item is ceased to be displayed and the particular displayed first content item fills the respective first area of the display region responsive to the release occurring in any area of the display region, the release capable of being performed in all areas of the display region.

14. The method of claim 13, wherein the second content item comprises at least one interactive user interface component.

15. The method of claim 13, further comprising:
causing display of the at least two first content items in a scrollable portion; in response to the first user input, translating the particular displayed first content item while other first content items remain stationary.

16. A non-transitory computer-readable medium, having computer-readable instructions stored thereon for:
causing display of at least two first content items in a display region of a display, such that each of the displayed first content items fills a respective first area of the display region;
determining second content items comprising metadata relating to each of the respective first content items, wherein each of the second content items provide additional information about the respective first content item, wherein prior to a drag input associated with a particular displayed first content item, a respective second content item comprising the metadata related to the particular displayed first content item is entirely obscured by the respective displayed first content item;
enabling the first content items to be dragged and translated independently of each other, such that in response to the reception of a first user input being the drag input associated with the particular displayed first content item, the non-transitory computer-readable medium comprises computer-readable instructions configured for: a) translating the particular displayed first content item to a second area of the display region along a path defined by the drag input, thereby gradually removing the particular displayed first content item from the respective first area of the display, and b) causing the respective second content item comprising the metadata relating to the particular displayed first content item, to be gradually revealed and displayed only in the respective first area of the display region that was previously obscured, such that a dragging of the particular displayed first content item completely out of the respective first area of the display region results in the respective second content item filling the respective first area of the display region; and
in response to a reception of a second user input being a release of the drag input performed while the particular displayed first content item and the respective second content item are displayed, ceasing to display the respective second content item and causing redisplay of the particular displayed first content item such that the particular displayed first content item fills the respective first area of the display region, wherein the respective second content item is ceased to be displayed and the particular displayed first content item fills the respective first area of the display region responsive to the release occurring in any area of the display region, the release capable of being performed in all areas of the display region.

17. The non-transitory computer-readable medium of claim 16, having additional computer-readable instructions stored thereon for:
  causing display of the at least two first content items in a scrollable portion;
  in response to the first user input, translating the particular displayed first content item while other first content items remain stationary.

* * * * *